United States Patent
Kubota et al.

(10) Patent No.: US 7,475,328 B2
(45) Date of Patent: Jan. 6, 2009

(54) LOOP STATUS MONITORING APPARATUS

(75) Inventors: Satoshi Kubota, Kawasaki (JP);
Hirotaka Shikada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 329 days.

(21) Appl. No.: 10/995,182

(22) Filed: Nov. 24, 2004

(65) Prior Publication Data
US 2006/0026471 A1 Feb. 2, 2006

(30) Foreign Application Priority Data
Jul. 30, 2004 (JP) ............................. 2004-224558

(51) Int. Cl.
*H03M 13/00* (2006.01)
(52) U.S. Cl. ................... 714/779; 714/770; 714/724; 709/224
(58) Field of Classification Search ............... 714/779, 714/770, 769, 766, 54, 716, 717, 724, 789; 709/224; 370/414; 379/399.01
See application file for complete search history.

(56) References Cited

U.S. PATENT DOCUMENTS

| | | | |
|---|---|---|---|
| 4,594,709 A * | 6/1986 | Yasue | 714/4 |
| 5,487,448 A * | 1/1996 | Schollkopf et al. | 187/247 |
| 6,661,893 B1 * | 12/2003 | Vaughn et al. | 379/399.01 |
| 6,961,767 B2 * | 11/2005 | Coffey et al. | 709/224 |
| 7,110,414 B2 * | 9/2006 | Coffey | 370/403 |
| 2002/0194371 A1 * | 12/2002 | Kadoi | 709/239 |

FOREIGN PATENT DOCUMENTS

JP 2002-7077 A 1/2002

* cited by examiner

*Primary Examiner*—M. Mujtaba K Chaudry
*Assistant Examiner*—Fritz Alphonse
(74) *Attorney, Agent, or Firm*—Staas & Halsey LLP

(57) ABSTRACT

A loop status monitoring apparatus monitors a status of an arbitration loop that includes a plurality of devices and a switch that controls connections between the devices, has at least one of loop status detection data, primitive detection data, and frame count data, and includes a failure detecting unit that detects whether an initialization failure, which is a connection failure, has occurred during an initialization of the arbitration loop from the loop status detection data; and a device identifying unit that identifies, when the initialization failure is detected, a device with the initialization failure occurred from the primitive detection data or the frame count data.

10 Claims, 10 Drawing Sheets

| HEAD REGISTER | LOOP STATUS DETECTION DATA |
|---|---|
|  | ALPA MAP |
| PORT REGISTER 0 | PRIMITIVE DETECTION DATA |
|  | FRAME COUNT DATA |
| PORT REGISTER 1 | PRIMITIVE DETECTION DATA |
|  | FRAME COUNT DATA |
| PORT REGISTER 2 | PRIMITIVE DETECTION DATA |
|  | FRAME COUNT DATA |
| ...... | ...... |
|  | ...... |
| ...... | ...... |
|  | ...... |
| PORT REGISTER 17 | PRIMITIVE DETECTION DATA |
|  | FRAME COUNT DATA |

FIG.5

| | |
|---|---|
| WRITE INDEX | INDEX |
| | ADDRESS |
| HEAD REGISTER | LOOP STATUS DETECTION DATA |
| | ALPA MAP |
| PORT REGISTER 0 | PRIMITIVE DETECTION DATA |
| | FRAME COUNT DATA |
| PORT REGISTER 1 | PRIMITIVE DETECTION DATA |
| | FRAME COUNT DATA |
| …… | …… |
| | …… |
| …… | …… |
| | …… |
| PORT REGISTER 17 | PRIMITIVE DETECTION DATA |
| | FRAME COUNT DATA |
| HEAD REGISTER | …… |
| PORT REGISTER 0 | …… |
| …… | …… |
| PORT REGISTER 17 | …… |
| HEAD REGISTER | …… |
| …… | …… |
| …… | …… |

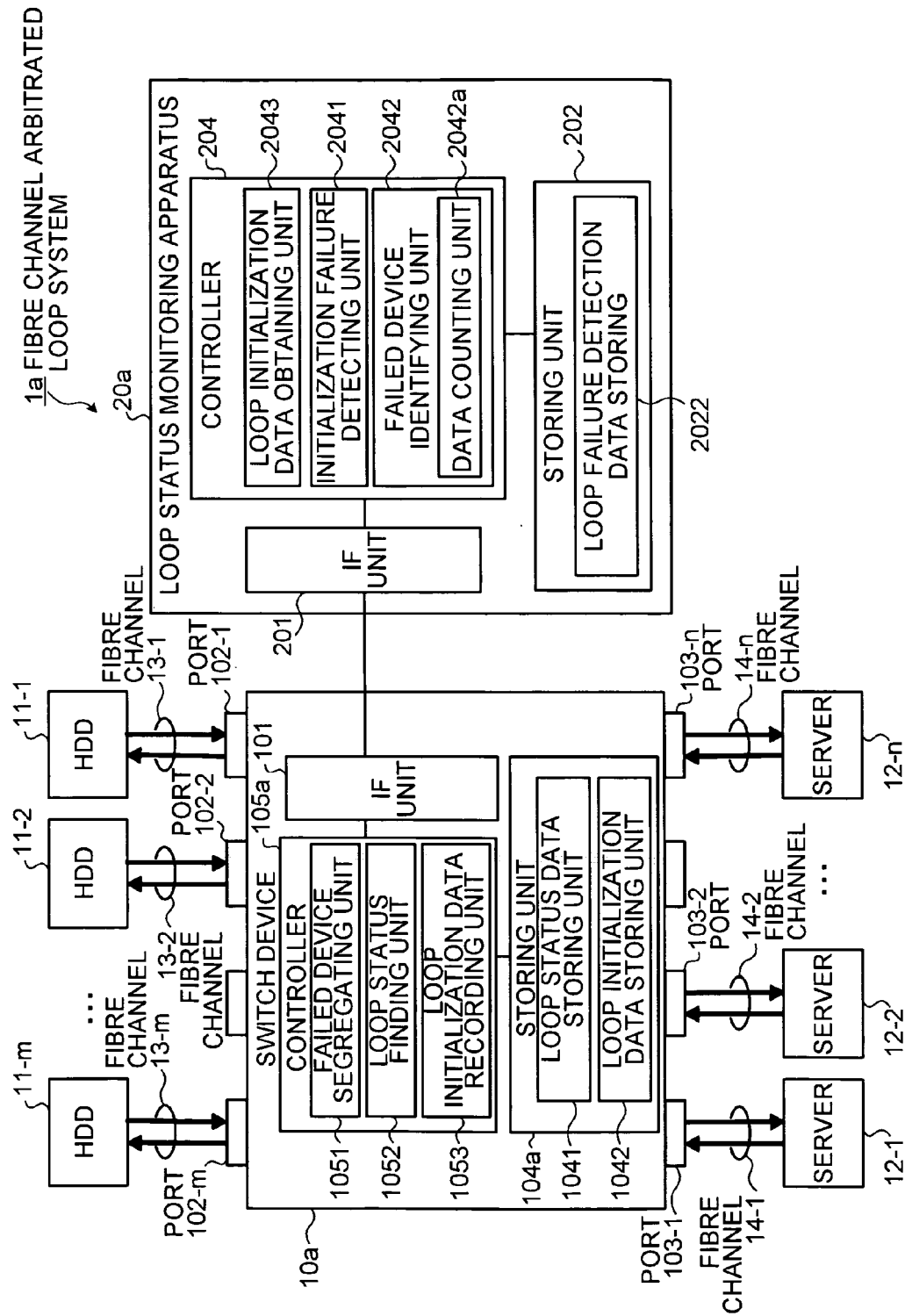

LOOP STATUS MONITORING APPARATUS

BACKGROUND OF THE INVENTION

1) Field of the Invention

The present invention relates to a loop status monitoring apparatus, and more particularly, to a loop status monitoring apparatus that can identify a device with a connection failure occurred when no signal failure is found even if an initialization process in an arbitration loop is stopped to quickly restore the loop to a normal status.

2) Description of the Related Art

Conventionally, loop status monitoring devices that monitor the status of a plurality of devices and arbitration loops that have switches for control the connection between the devices. When a connection failure occurs in the arbitration loop, the conventional loop status monitoring device has to await completion of the initialization process of the arbitration loop in order to identify the device that has caused the connection failure. When the initializing process is stopped, the arbitration loop cannot be used and the device cannot be accessed. Even if connection failure is found because of a signal failure during the initialization process, countermeasure in the form of switching to reserve arbitration loop is necessary since the device causing the connection failure is not identified. Even if a reserve arbitration loop is used, if the device with the connection failure is not segregated, there is a possibility of connection failure occurring in the reserve arbitration loop as well.

Recent technological developments have produced devices which automatically send unvarying signals even if failure occurs. In this case, even if the initialization process in the arbitration loop halts, because no signal failure is found the device with the connection failure cannot be identified, and quick restoration of the loop to normal status cannot be achieved. For instance, in the conventional technology disclosed in Patent literature 1, a process is proposed whereby, if intermittent connection failure occurs in the arbitration loop to which a disk is connected, normal disk process is temporarily stopped to perform a loop diagnostic process for identifying the failed part, and a reserve loop is pressed into server to perform the normal disk process. However, in the conventional technology disclosed in Patent literature 1, even if the initialization process in the arbitration loop halts, because no signal failure is found the device with the connection failure cannot be identified, and quick restoration of the loop to normal status cannot be achieved.

SUMMARY OF THE INVENTION

It is an object of the present invention to solve at least the above problems in the conventional technology.

A loop status monitoring apparatus according to one aspect of the present invention, which monitors a status of an arbitration loop that includes a plurality of devices and a switch that controls connections between the devices, includes at least one of loop status detection data that is a result of detecting a status of the arbitration loop, primitive detection data that is a result of detecting whether a primitive has been received at each of a plurality of ports of the switch, and frame count data that is a result of detecting a frame count received by each of the ports; a failure detecting unit that detects whether an initialization failure, which is a connection failure, has occurred during an initialization of the arbitration loop from the loop status detection data; and a device identifying unit that identifies, when the initialization failure is detected, a device with the initialization failure occurred from the primitive detection data or the frame count data.

A loop status monitoring method according to another aspect of the present invention, which is for a loop status monitoring apparatus that monitors a status of an arbitration loop that includes a plurality of devices and a switch that controls connections between the devices, and has at least one of loop status detection data that is a result of detecting a status of the arbitration loop, primitive detection data that is a result of detecting whether a primitive has been received at each of a plurality of ports of the switch, and frame count data that is a result of detecting a frame count received by each of the ports, includes detecting whether an initialization failure, which is a connection failure, has occurred during an initialization of the arbitration loop from the loop status detection data; and identifying, when the initialization failure is detected, a device with the initialization failure occurred from the primitive detection data or the frame count data.

A computer-readable recording medium according to still another aspect of the present invention stores a loop status monitoring program that causes a computer to execute the above loop status monitoring method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a drawing of loop initialization data stored in a loop initialization data storing unit shown in FIG. 1;

FIG. 11 is a functional block diagram of the fiber channel arbitration loop according to a second embodiment of the present invention.

DETAILED DESCRIPTION

Exemplary embodiments of a loop status monitoring apparatus according to the present invention are explained in detail with reference to the accompanying drawings. The following two embodiments are explained:

(1) In a first embodiment of the present invention, the loop status monitoring apparatus reads from a switch device loop initialization data of the arbitration loop, stores the loop initialization data, and based on the stored loop initialization data, identifies the device with a connection failure; and (2) In a second embodiment of the present invention, the loop status monitoring apparatus identifies the device with a connection failure based on the loop initialization data stored in the switch device.

In the first embodiment, the loop status monitoring apparatus reads from a switch device loop initialization data of the arbitration loop, stores the loop initialization data, and based on the stored loop initialization data, identifies the device with a connection failure. An overview and main features of the loop status monitoring apparatus are explained under section (1-1). A system configuration of a fiber channel arbitration loop system is explained under section (1-2). A fiber channel arbitration loop protocol in the initialization process is explained under section (1-3). Loop status data and the loop initialization data are explained under section (1-4). An initialization process flow is explained under section (1-5). An initialization failure process flow is explained under section (1-6). A Loop Initialization Primitive (LIP) reception device failure process flow is explained under section (1-7). A loop initialization select master (LISM) through loop initialization for reporting relative positions of arbitration loop physical address (ALPAs) (LILP) frames reception device failure process flow is explained under section (1-8). A fiber channel close primitive (CLS) reception device failure process flow is explained under section (1-9). LIP, LISM, LILP, and CLS are explained separately.

(1-1) Overview and Main Features of Loop Status Monitoring Apparatus

Figure 1:
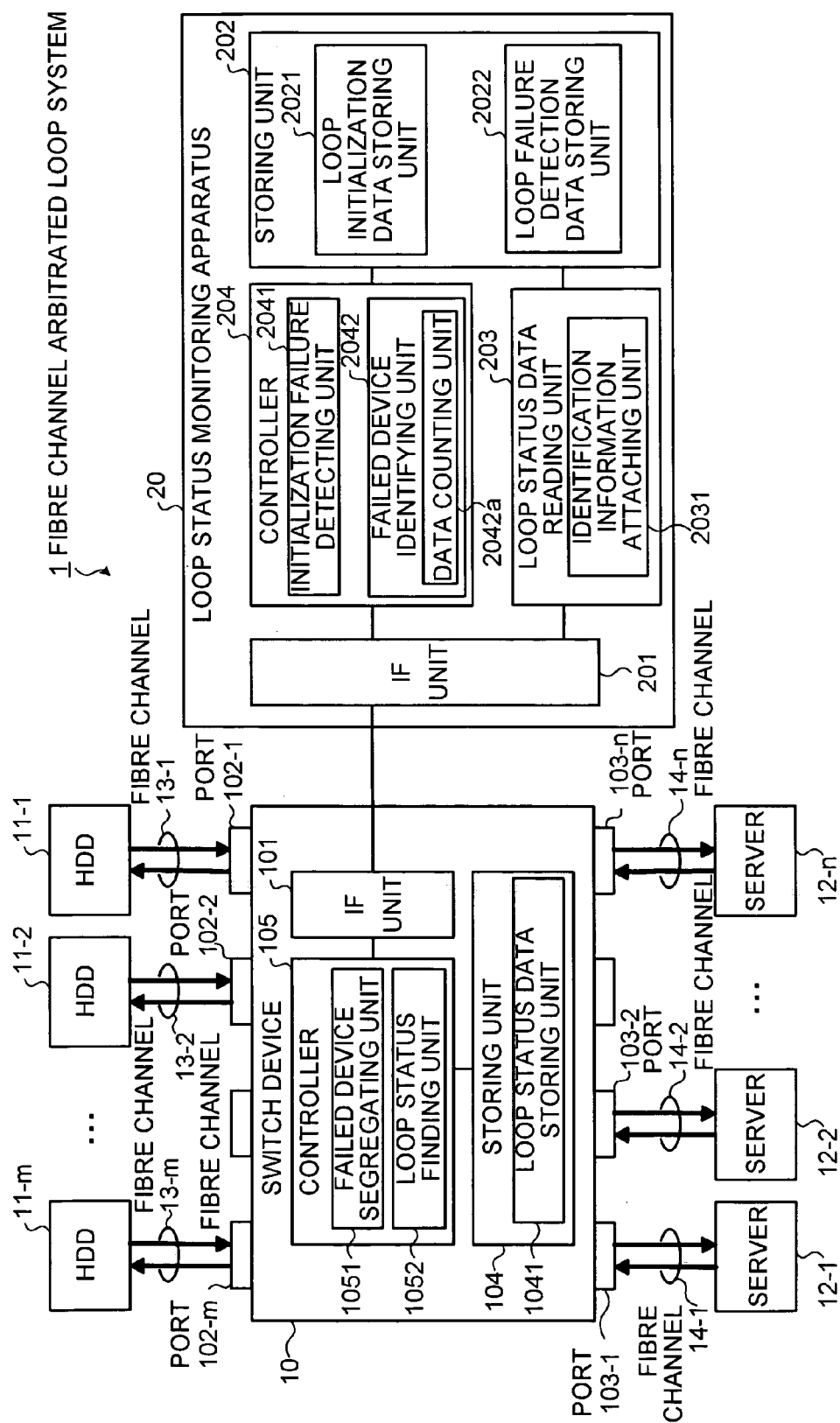
FIG. 1 is a functional block diagram of a fiber channel arbitration loop according to a first embodiment of the present invention.

An overview of the loop status monitoring apparatus according to the first embodiment of the present invention is explained with reference to FIG. 1. FIG. 1 is a functional block diagram of the fiber channel arbitration loop system according to the first embodiment of the present invention. The loop status monitoring apparatus 20 according to the first embodiment is an apparatus that monitors the status of the arbitration loop that includes a switch device 10, which controls the connections between a plurality of devices, and possesses the characteristic of identifying the device in which connection failure has occurred when no signal failure is found, even if the initialization process in the arbitration loop halts, thus quickly restoring the loop to a normal status.

An initialization failure detecting unit 2041 detects, from loop status detection data, whether an initialization failure in the form of a connection failure has occurred in the arbitration loop. When it is found that an initialization failure has occurred, a failed device identifying unit 2042 identifies, from primitive detection data or frame count data, the device in which the initialization failure has occurred. Consequently, the loop status monitoring apparatus 20 identifies the device in which connection failure has occurred when no signal failure is found, even if the initialization process in the arbitration loop halts, thus quickly restoring the loop to a normal status. The loop status monitoring apparatus 20 includes the loop status data, which includes at least one of either the loop status detection data, or the primitive detection data, or the frame count data. The loop status detection data is data pertaining to detection of the status of the arbitration loop. The primitive detection data is data pertaining to whether each port of a plurality of ports of the switch that connects a plurality of devices has received a primitive. The frame count data is data pertaining to detection of frame count received by each port of the plurality of ports.

(1-2) System Configuration of Fiber Channel Arbitration Loop

The system configuration of a fiber channel arbitration loop system 1 according to the first embodiment is explained next with reference to FIG. 1. The fiber channel arbitration loop system 1 includes a switch device 10, hard disk drives (HDD) 11-1 through 11-$m$, servers 12-1 through 12-$n$, fiber channels 13-1 through 13-$m$ and 14-1 through 14-$n$, and a loop status monitoring apparatus 20. A maximum of 126 devices such as HDD and server can be connected in the fiber channel arbitration loop system 1.

The switch device 10 connects the HDD 11-1 through 11-$m$ and the servers 12-1 through 12-$n$ via the fiber channels 13-1 through 13-$m$ and 14-1 through 14-$n$, and controls the transmission of data. The switch device includes an interface (I/F) unit 101, ports 102-1 through 102-$m$ and 103-1 through 103-$n$, a storing unit 104, and a controller 105. 18 devices can be connected by one switch device 10. Thus, eight cascaded switch devices 10 may be connected in a 126-device fiber channel arbitration loop system 1. The I/F unit 101 is an interface that enables input and output of the loop status data of the switch device 10 and the loop status monitoring apparatus 20, and may, for instance, be an inter IC (IIC) bus.

The ports 102-1 through 102-$m$ and 103-1 through 103-$n$ are two-way transmission ports that connect the HDD 11-1 through 11-$m$ and the servers 12-1 through 12-$n$ by the fiber channels 13-1 through 13-$m$ and 14-1 through 14-$n$. The storing unit 104 is a register that stores the status of the switch device 10, and includes a loop status data storing unit 1041. The loop status data storing unit 1041 stores the loop status data, which pertains to the status of the switch device 10 and the 18 ports of the switch device 10. The loop status data is explained in detail in a later section.

The controller 105 controls the connections of the fiber channel arbitration loop system 1, and includes a failed device segregating unit 1051 and a loop status finding unit 1052. When a connection failure is found by the loop status monitoring apparatus 20, the failed device segregating unit 1051 segregates the device in which failure has occurred from the fiber channel arbitration loop system 1 by bypassing the port to which the failed HDD 11-1 through 11-$m$ and the server 12-1 through 12-1 is connected. The loop status finding unit 1052 finds the loop status data, which pertains to the status of the switch device 10 and the ports 102-1 through 102-$m$ and 103-1 through 103-$m$, and stores the loop status data in the loop status data storing unit 1041.

The HDD 11-1 through 11-$m$ are magnetic disk storage devices, and are connected to the switch device 10 by the fiber channels 13-1 through 13-$m$. The server 12-1 through 12-$n$ are server devices that input data to and output data from the HDD 11-1 through 11-$m$, and are connected to the switch device 10 by the fiber channels 14-1 through 14-$n$.

The fiber channel 13-1 through 13-$m$ and 14-1 through 14-$n$ is a transmission medium of the arbitration loop that performs serial transmission, and includes two fiber cables, one for sending data and one for receiving data. Multi-mode or single-mode optical fiber used in laser transmission, shielded twisted pair (STP), coaxial cable, etc. may be used as the transmission medium.

The loop status monitoring apparatus 20 is a device that monitors the status of the arbitration loop that includes a plurality of devices and a switch that controls the connections between the devices. The loop status monitoring apparatus 20 includes an I/F unit 201, a storing unit 202, a loop status data reading unit 203, and a controller 204. The I/F unit 201 is in interface that enables input and output of the loop status data or a control request between the switch device 10 and the loop status monitoring apparatus 20, and may, for instance, be an IIC bus.

The storing unit 202 is a storage device such as an Electrically Erasable and Programmable Read Only Memory (EEPROM), flush memory etc., and includes a loop initialization data storing unit 2021 and a loop failure detection data storing unit 2022. The loop initialization data storing unit 2021 stores the loop initialization data, which is a sequence of loop status data during the initialization of the arbitration loop obtained from the switch device 10, by correlating the loop initialization data with an index and an address. The loop-failure-detection-data storing unit 2022 stores loop failure detection data, which is correlation data between the index that identifies the loop initialization data obtained from the switch device 10 and a failure detection flag that indicates detection of initialization failure. The loop initialization data is explained in detail in a later section.

The loop status data reading unit 203 reads the loop status data from the loop status data storing unit 1041 of the switch device 10. To be specific, the loop status data reading unit 203 is a hardware reader. The loop status data reading unit 203 includes an identification-information attaching unit 2031. The identification-information attaching unit 2031 attaches identification information to the loop initialization data, which is a sequence of loop status data obtained during initialization. The identification information includes an index that identifies the loop initialization data as a time series data and the address at the beginning of the loop initialization data. For instance, the hardware reader reads the loop status data every 50 μsec during the initialization process of the arbitration loop, attaches an index and an address information at the beginning of the sequence of the obtained loop status data, and stores the loop status data to which the index and the address are attached, in the loop initialization data storing unit 2021.

The controller 204 controls the entire loop status monitoring apparatus, and includes the initialization failure detecting unit 2041 and the failed device identifying unit 2042. The initialization failure detecting unit 2041 detects, from loop status detection data, whether an initialization failure in the form of a connection failure has occurred in the arbitration loop.

When it is found that an initialization failure has occurred, the failed device identifying unit 2042 identifies the device in which the initialization failure has occurred. The failed device identifying unit 2042 includes a data counting unit 2042*a*. The data counting unit 2042*a* counts, for each device, the primitive detection data or the frame count data for which no reception of the primitive or the frame required for the initialization is found. If the number of the primitive detection data or the frames count data is above a predetermined value, the data counting unit 2042*a* identifies the device as one with failed initialization.

To be specific, the data counting unit 2042*a* counts, for each device, the primitive detection data for which no reception of a loop initialization commencing primitive, required for commencing the initialization, is found. Similarly, the data counting unit 2042*a* counts, for each device, the frame count data for which no reception of frame, required for the initialization, is found. The data counting unit 2042*a* counts, for each device, the primitive detection data for which no reception of an initialization terminating primitive, required for ending the initialization, is found.

The failed device identifying unit 2042 controls the failed device segregating unit 1051 in such a way that the device with failed initialization is segregated from the arbitration loop. The failed device identifying unit 2042 controls the switch device 10 in such a way that the port of the switch unit 10 connected to the device with failed initialization is bypassed.

(1-3) Fiber Channel Arbitration Loop Protocol Initialization Process

Figure 2:
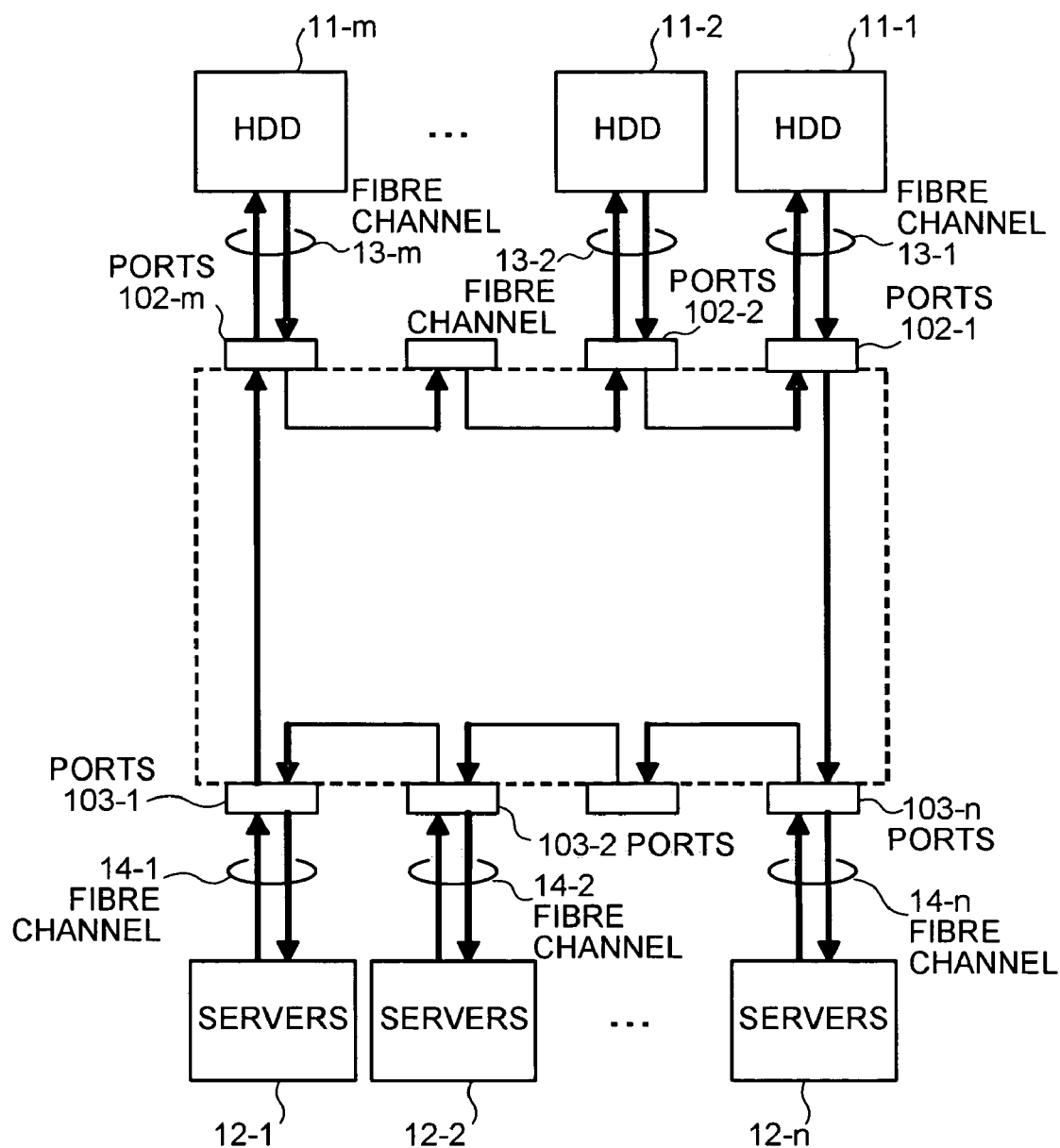
FIG. 2 is a drawing showing the connections in the initialization of the fiber channel arbitration loop system 1 shown in FIG. 1.

A connection in the initialization of the fiber-channel arbitration loop system 1 shown in FIG. 1 is explained next with reference to FIG. 1. FIG. 2 is a drawing showing the connections in the initialization of the fiber channel arbitration loop system 1 shown in FIG. 1.

The devices such as HDD 11-1 through 11-*m*, the servers 12-1 through 12-*n*, etc. of the fiber channel arbitration loop system 1 are connected in a loop form during initialization, and once initialization is completed, the devices are connected one-to-one. The initialization of the arbitration loop is carried out with an object of making the switch device 10 get an ALPA map, which is a map of physical addresses of the devices such as the HDD, servers, etc. Once the switch device 10 gets the ALPA map of the connected devices, the devices can be connected one-to-one.

Since the initialization process takes place when the devices in the arbitration loop are connected in a loop form, the initialization process halts if a device fails during the initialization process. Further, if the device in which failure has occurred continues to send unvarying signals, it will remain unidentified since it cannot be differentiated from the rest of the devices. Consequently, restoring the loop to its normal status will take very long. The present invention is proposed to cope with this situation. The initialization process of the arbitration loop is explained here to give a technical background of the present invention. The initialization process of the arbitration loop is divided into (a) a LIP reception phase, (b) a LISM through LILP frames reception phase, and (c) a CLS reception phase.

(a) LIP reception phase: The switch device 10 passes on in a fixed direction, for instance, from HDD 11-1, HDD 11-2, and so on to HDD 11-*m*, server 12-1, server 12-2, and so on to server 12-*n*, the initialization commencing primitive called LIP. Each device passes along the LIP to the next device until it reaches the last device, from where switch device 10 receives it. The initialization of the loop commences once the switch device 10 receives back the LIP. When a device is unable to pass on the LIP to the next device, the LIP remains with the former device and cannot return to the switch device 10. Consequently, the LIP reception phase remains incomplete. Thus, the device in which failure has occurred can be identified by finding if the LIP has been received by each reception port. A primitive is a command defined in the fiber channel arbitration loop protocol.

(b) LISM through LILP frames reception phase: The LISM frame determines the device, known as a loop master that leads the initialization process, and is distributed at the beginning of the phase. The LILP frame distributes the ALPA map to each device, and is distributed at the end of the phase. Once the loop master device is determined by the LISM frame, the loop master leads the subsequent initialization process. Thus, the LISM through LILP frames reception phase can be divided into pre-loop master determination phase and post-loop master determination phase.

(b-1) Pre-loop master determination phase: Each device passes on in a fixed direction, for instance, from HDD 11-1, HDD 11-2, and so on to HDD 11-*m*, server 12-1, server 12-2, and so on to server 12-*n*, a unique identification information called world-wide name in a data format called a frame. The data format is a four-byte data enclosed between a four-byte Start of File (SOF) and a four-byte End of File (EOF). The device that receives the frame from the previous device compares the word-wide name written in the received frame with its own world-wide name, replaces its own world-wide name with the received world-wide name if the former is smaller than the latter, and passes on the world-wide name to the next device.

If the device's own world-wide name is greater than the received world-wide name, the device passes on the frame to the next device as it is. As a result, the frame that carries the least world-wide name is passed along. Consequently, if a frame returns to a device of its origin, it can be surmised that the frame is carrying the least world-wide name. The device that has the least world-wide name is determined to be the loop master. Once determined, the loop master leads the subsequent initialization process of the fiber channel arbitration loop system.

If a device fails before the loop master is determined, the LISM frame gets stuck in the device in which failure has occurred and is not passed on to the next device. Thus, the device in which failure has occurred can be identified by comparing the LISM frame count received by each reception portion.

(b-2) Post-loop master determination phase: The physical address of each device is determined by the initiation of the loop master. When this phase ends, the switch device 10 gets the ALPA map of each device. A loop master port acts as the starting point in this phase. Thus, the device in which failure has occurred can be identified by comparing the number of frames received by each reception port with the loop master port as the starting point.

(c) CLS reception phase: The loop master passes on the initialization terminating primitive called CLS, and each device connected in the arbitration loop passes along the CLS to the next device, until the CLS comes back to the loop master. The initialization of the loop ends once the loop master receives back the CLS. When a device is unable to pass on the CLS to the next device, the CLS remains with the former device and cannot return to the loop master. Consequently, the CLS reception phase remains incomplete. Thus, the device in which failure has occurred can be identified by finding if the CLS has been received by each reception port.

(1-4) Loop Status Data and Loop Initialization Data

Figures 3, 4:
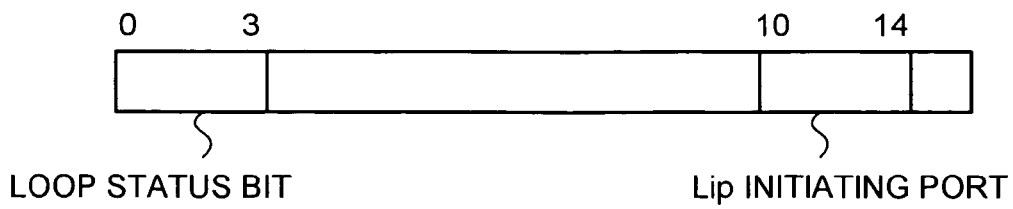
FIG. 3 is a drawing of loop status data stored in a loop status data storing unit shown in FIG. 1.
FIG. 4 is a drawing of a data structure of loop status detection data shown in FIG. 3.

The loop status data stored in the loop status data storing unit 1041 shown in FIG. 1 and the loop initialization data stored in the loop initialization data storing unit 2021 shown in FIG. 1 are explained next with reference to FIG. 3 and FIG. 5. FIG. 3 is a drawing of the loop status data stored in the loop status data storing unit 1041 shown in FIG. 1. FIG. 5 is a drawing of the loop initialization data stored in the loop initialization data storing unit 2021 shown in FIG. 1.

As shown in FIG. 3, the loop status data storing unit 1041 includes 18 port registers and one head register. The loop status finding unit 1052 finds and records the primitive detection data and the frame count data for each of the 18 ports, and the loop status detection data and the ALPA map for the head register.

When a primitive such as the LIP or the CLS is received from each of the reception ports, the loop status finding unit 1052 records the received primitive as the primitive detection data in the port register of the relevant reception port. The loop status finding unit 1052 also records the frame count of the LISM frame received by each of the reception ports as the frame count data in the port register of the relevant reception port.

The loop status finding unit 1052 finds the status of the arbitration loop and records the found status of the arbitration loop as the loop status detection data in the head register. A data structure of the loop status detection data shown in FIG. 3 is explained with reference to FIG. 4. FIG. 4 is a drawing of the data structure of the loop status detection data shown in FIG. 3.

The loop status detection data is a 4-byte data. The bits 0 to 3 represent a loop status bit that identifies the status of the loop. Whether a device has failed can be determined by the alteration in the loop status bit. To be specific, the loop status bit indicates four different status of the loop, namely, (a) "0000", which indicates that the loop is idle, (b) "0001", which indicates that the loop initialization commencing primitive is detected, (c) "0010", which indicates that SOF of the frame is detected, and (d) "0011", which indicates that the initialization is completed. For instance, it can be surmised that a connection failure has occurred if the loop status bit is "0000", that is, if the loop status bit indicates that the loop is idle, even if the loop initialization is commenced. Based on the unchanging loop status bit, it can be surmised that the initialization has stopped due to some reason. It can be surmised that a connection failure has occurred in the loop when the loop status bit changes from "1011" to any other status.

The bits 10 to 14 of the loop status detection data represent an LIP initiating port or the loop master port. The port or the loop master port from which the LIP is passed on can be identified from the LIP initiating port or the loop master port. The rest of the bits of the loop status detection data are not directly relevant to the present embodiment and hence are not explained here.

As shown in FIG. 5, the loop initialization data is a sequence of loop status data to which an index and an address is attached. The index identifies the latest loop status data that is read by the loop status data reading unit 203 every 50 μsec. The address is an opening address of the memory area in which the sequence of loop status data, starting from the latest loop status data and identified by an index, is stored.

The initialization failure detecting unit 2041 detects, based on the altered loop status bit of the loop status detection data, whether an initialization failure has occurred in the arbitration loop. Upon detecting that an initialization failure has occurred, the initialization failure detecting unit 2041 controls the loop failure detection data storing unit 2022 in such a way that it stores the loop failure detection data, which is the loop initialization data with a failure detection flag correlated with the index. The failure device identifying unit 2042 reads the loop initialization data stored in the loop initialization data storing unit 2021, and identifies, based on the primitive detection data or the frame count data of each port, the device in which failure has occurred.

(1-5) Initialization Process Flow

Figure 6:
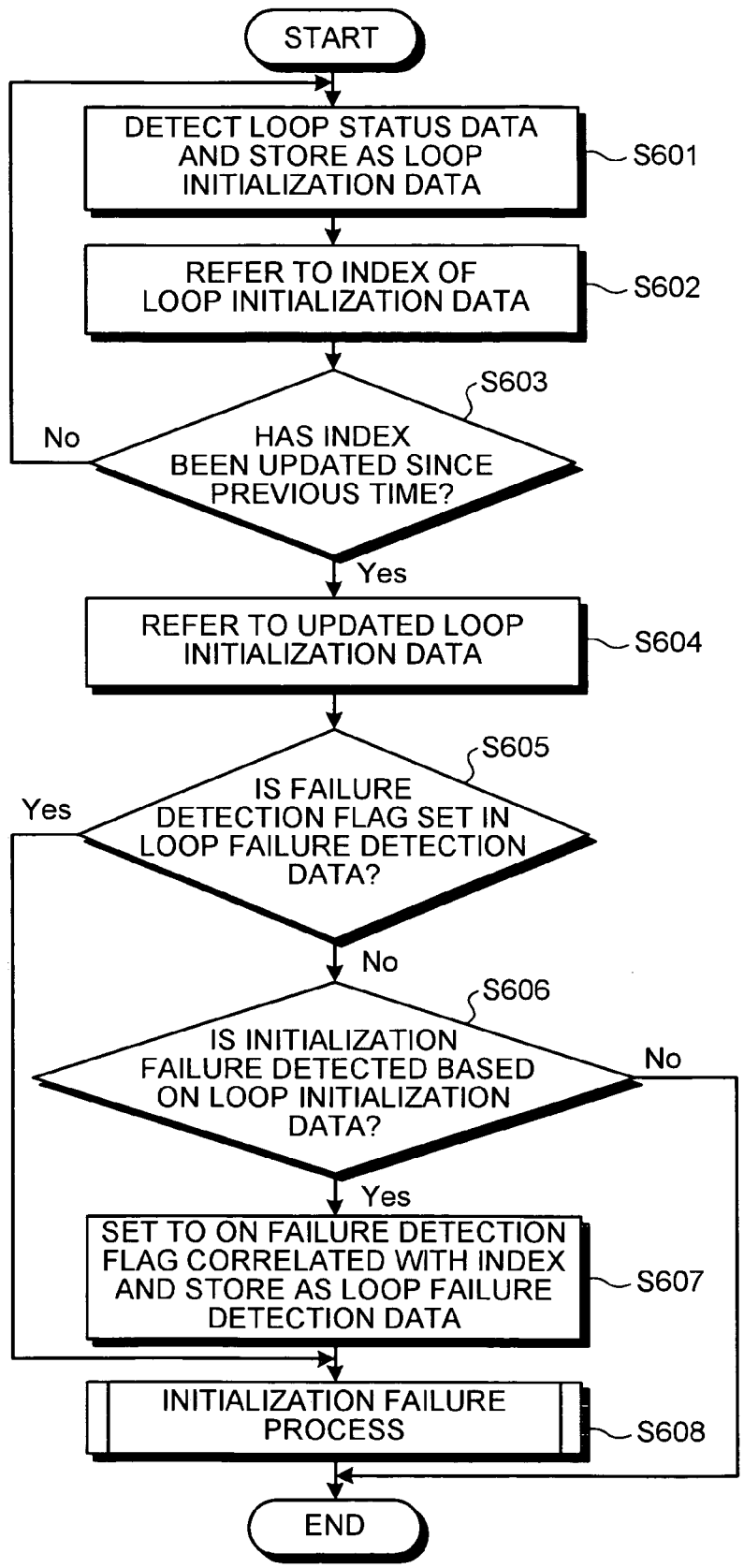
FIG. 6 is a flow chart of an initialization process flow of a loop status monitoring apparatus shown in FIG. 1.

The initialization process flow of the loop status monitoring apparatus 20 shown in FIG. 1 is explained next with reference to FIG. 6. FIG. 6 is a flow chart of the initialization process flow of the loop status monitoring apparatus 20 shown in FIG. 1. This process flow is repeated as the initialization process when the fiber channel arbitration loop 1 is started up.

The loop status data reading unit 203 sequentially adds the loop status data read by the switch device 10 to the loop initialization data, attaches an updated index and address to the loop initialization data, and controls the loop initialization data storing unit 2021 in such a way that it stores the loop initialization data (Step S601). The initialization failure detecting unit 2041 reads from the loop initialization data storing unit 2021 the loop initialization data and refers to the index of the loop initialization data (Step S602).

The initialization failure detecting unit 2041 determines whether the index has been updated since the previous time the loop initialization data was read (Step S603). As a result, if the index has not been updated since the previous time the loop initialization data was read ("NO" at Step S603), the initialization failure detecting unit 2041 returns to Step S601. If the index has been updated since the previous time the loop initialization was read ("YES" at Step S603), the initialization failure detecting unit 2041 refers to the latest loop initialization data (Step S604).

The initialization failure detecting unit 2041 then determines whether the failure detection flag is set in the loop failure detection data stored in the loop failure detection data storing unit 2022 (Step S605). If the failure detection flag is set in the loop failure detection data ("YES" at Step S605), the controller 204 carries out the initialization failure process (Step S608). If no failure detection flag is set in the loop failure detection data ("NO" at Step S605), the initialization failure detecting unit 2041 determines, based on the loop status detection data of the loop initialization data, whether initialization failure is detected (Step S606). For instance, if the loop status bit is "0000" even if the loop initialization is commenced, the initialization failure detecting unit 2041 determines that a connection failure has occurred in the loop based on the idle state of the loop.

If it is determined, based on the loop status detection data, that no initialization failure has occurred ("NO" at Step S606), the initialization failure detecting unit 2041 ends the initialization process. If it is determined, based on the loop status detection data, that initialization failure has occurred ("YES" at Step S606), the initialization failure detecting unit 2041 sets to ON the failure detection flag correlated with the index and stores it as the loop failure detection data (Step S607), and starts the initialization failure process (Step S608).

Thus, the initialization failure detecting unit 2041 determines, based on the loop status detection data, whether initialization failure has occurred, and carries out the initialization failure process when initialization failure is detected. Consequently, the loop status monitoring apparatus 20 detects initialization failure when no signal failure is found even if the initialization process in the arbitration loop halts, thus quickly restoring the loop to a normal status.

(1-6) Initialization Failure Process Flow

Figure 7:
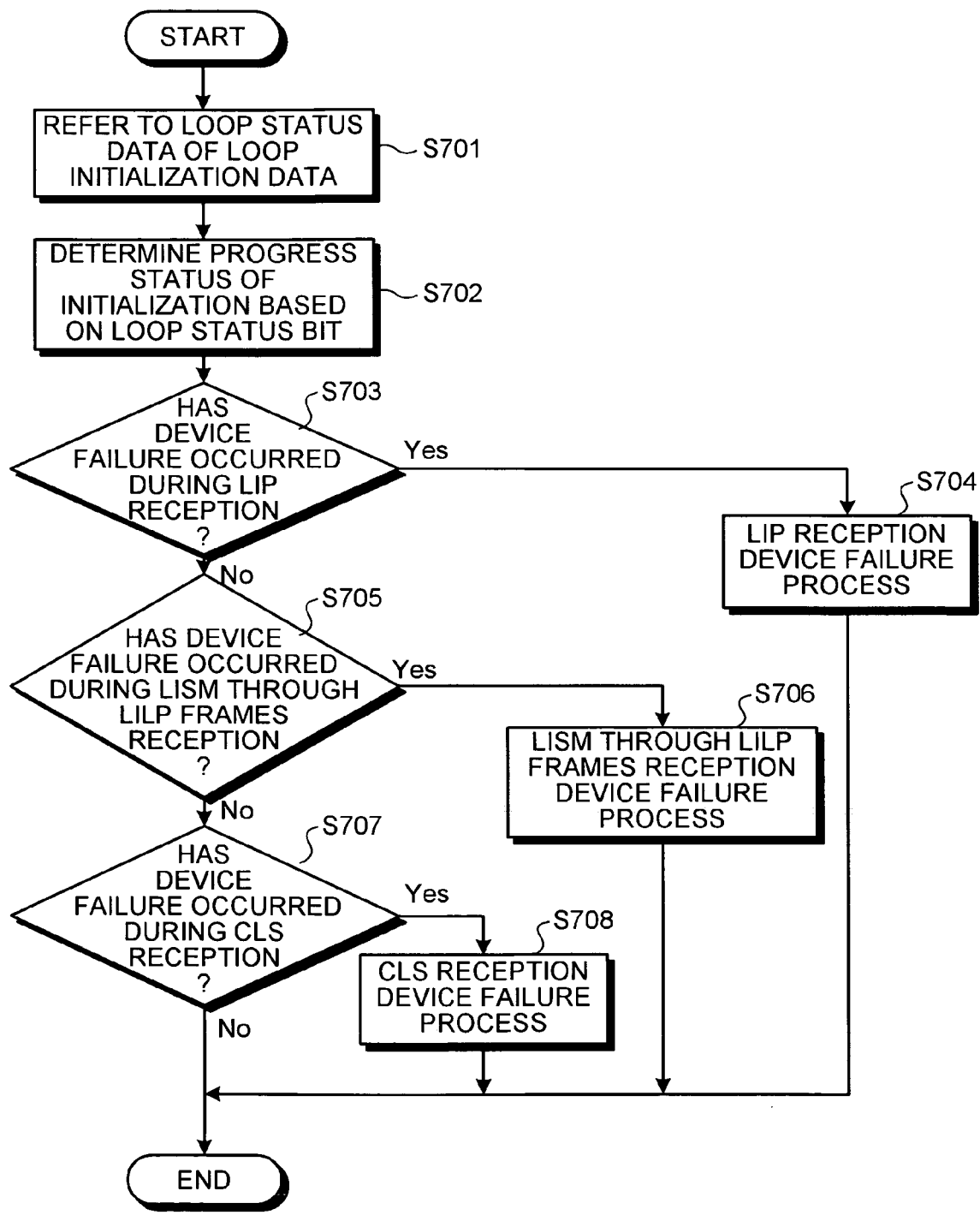
FIG. 7 is a flow chart of an initialization failure process shown in FIG. 6.

The initialization failure process of Step S608 shown in FIG. 6 is explained next with reference to FIG. 7. FIG. 7 is a flow chart of the initialization failure process of Step S608 shown in FIG. 6. The initialization failure detecting unit 2041 refers back to the loop status detection data of the loop initialization data shown in FIG. 4 (Step S701). The initialization failure detecting unit 2041 determines the progress status of the initialization based on the loop status bit of the loop status detection data (Step S702).

The initialization failure detecting unit 2041 determines, based on the loop status bit, whether a device failure has occurred during LIP reception (Step S703). If device failure has occurred during LIP reception ("YES" at Step S703), the initialization failure detecting unit 2041 advances to the LIP reception device failure process (Step S704).

If no device failure has occurred during LIP reception ("no" at Step S703), the initialization failure detecting unit 2041 further determines, based on the loop status bit, whether a device failure has occurred during LISM through LILP frames reception (Step S705). If a device failure has occurred during LISM through LILP frames reception ("YES" at Step S705), the initialization failure detecting unit 2041 advances to the LISM through LILP frames reception device failure process (Step S706).

If no device failure has occurred during LISM through LILP frames reception ("NO" at Step S705), the initialization failure detecting unit 2041 further determines, based on the loop status bit, whether a device failure has occurred during CLS reception (Step S707). If a device failure has occurred during CLS reception ("YES" at Step S707), the initialization failure detecting unit 2041 advances to the CLS reception device failure process (Step S708). If no device failure has occurred during CLS reception ("NO" at Step S707), the initialization failure detecting unit 2041 ends the initialization failure process.

Thus, the initialization failure detecting unit 2041 determines, based on the loop status bit of the loop status detection data, the initialization phase in which device failure has occurred, and carries out the device failure process in the respective initialization phase. Consequently, the loop status monitoring apparatus 20 determines the initialization phase in which connection failure has occurred when no signal failure is detected even if the initialization process in the arbitration loop is halted, thus quickly restoring the loop to its normal status.

(1-7) LIP Reception Device Failure Process Flow

Figure 8:
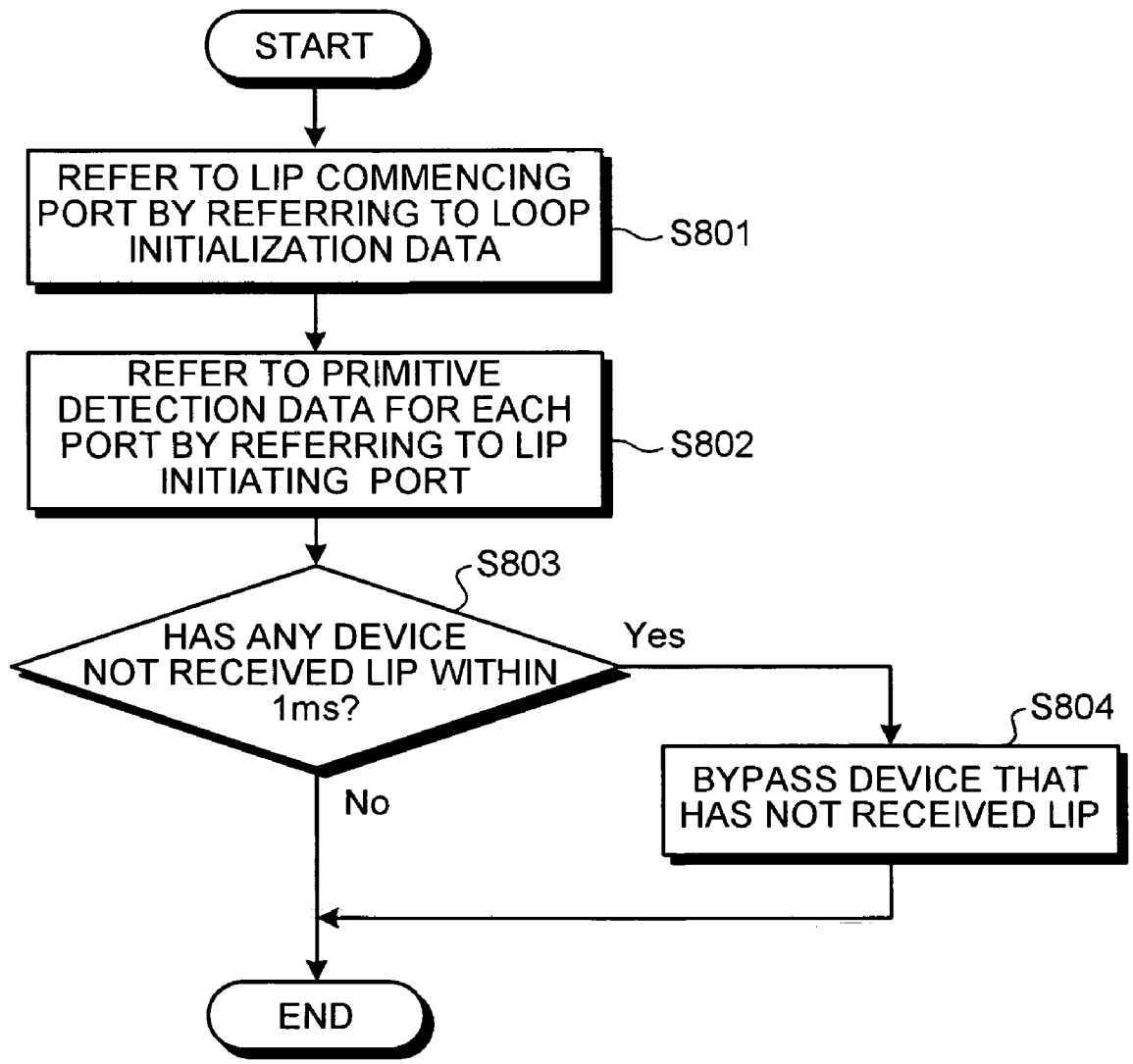
FIG. 8 is a flow chart of a LIP reception device failure process shown in FIG. 7.

The LIP reception device failure process of Step S704 shown in FIG. 7 is explained next with reference to FIG. 8. FIG. 8 is a flow chart of the LIP reception device failure process of Step S704 shown in FIG. 7. The failed device identifying unit 2042 refers to the LIP initiating port by referring to the bits 10 to 14 of the loop status detection data shown in FIG. 4 (Step S801).

The failed device identifying unit 2042 refers to the primitive detection data for each port by referring to the LIP initiating port (Step S802). The failed device identifying unit 2042 then refers back to the loop initialization data to determine if any device has not received the LIP within 1 msec (Step S803). If a device has not received the LIP within 1 msec ("YES" at Step S803), the failed device identifying unit 2042 controls the failed device segregating unit 1051 in such a way that the device that has not received the LIP within 1 msec is bypassed (Step S804). If no device is found that has not received the LIP within 1 msec, the failed device ("NO" at Step S1003) identifying unit 2042 ends the LIP reception device failure process. Since, the loop initialization data is read every 50 μsec, 0.1 msec is equivalent to data of 20 areas.

Thus, if a device does not receive the LIP within 1 msec, the failed device identifying unit 2042 controls the failed device segregating unit 1051 in such a way that the device is bypassed. Consequently, the loop status monitoring apparatus 20 identifies the device in which connection failure has occurred when no signal failure is detected even if the initialization process in the arbitration loop is stopped, thus quickly restoring the loop to its normal status.

(1-8) LISM through LILP Frames Reception Device Failure Process Flow

Figure 9:
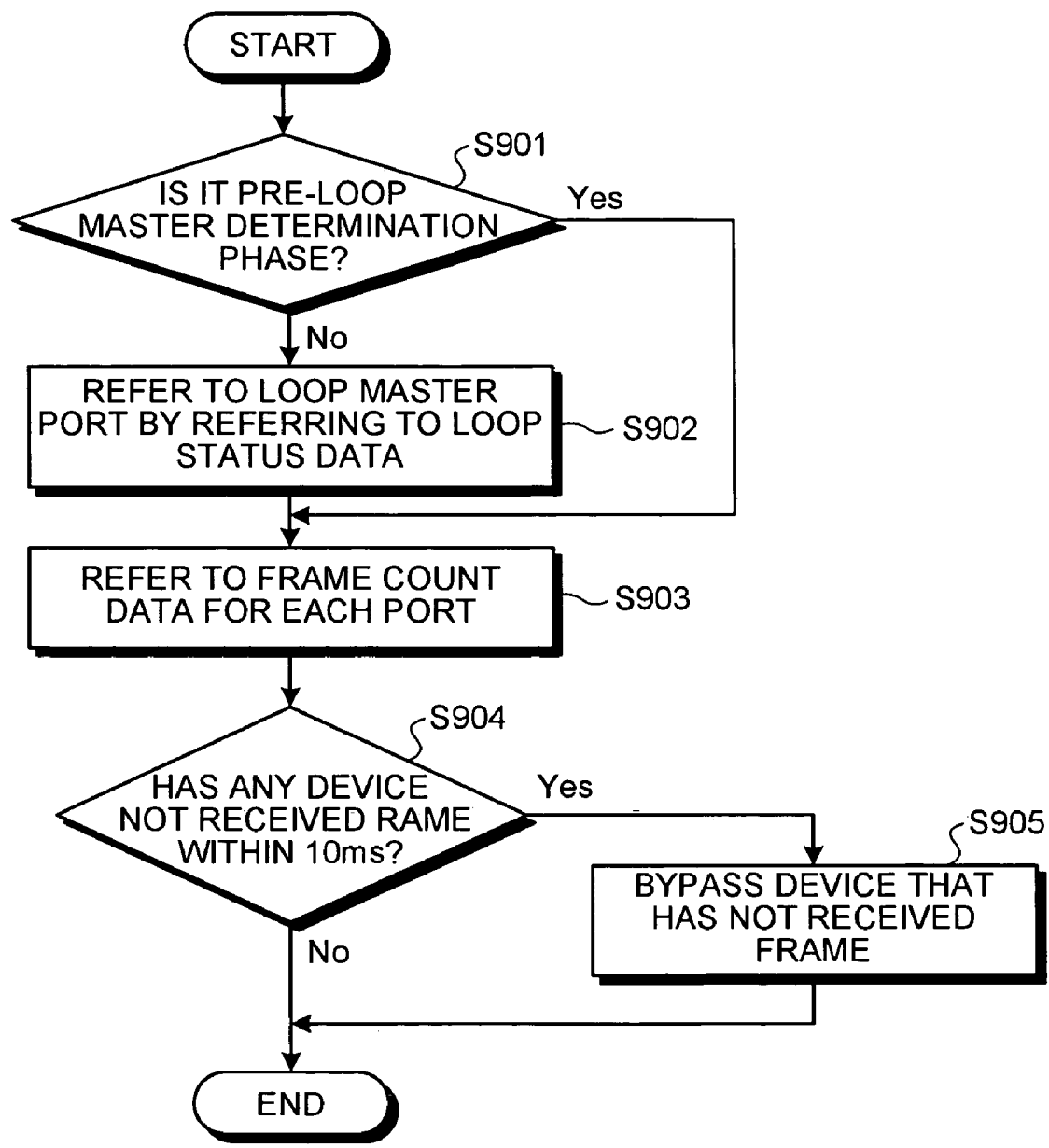
FIG. 9 is a flow chart of a LISM through LILP reception device failure process shown in FIG. 7.

The LISM through LILP frames reception device failure process of Step S706 shown in FIG. 7 is explained next with reference to FIG. 9. FIG. 9 is a flow chart of the LISM through LILP frames reception device failure process of Step S706 shown in FIG. 7. The failed device identifying unit 2042 determines whether the initialization phase is pre-loop master determination phase (Step S901). If the initialization phase is post-loop master determination phase ("NO" at Step S901), the failed device identifying unit 2042 refers to the loop master port by referring to the bits 10 to 14 of the loop initialization data shown in FIG. 4 (Step S902).

If the initialization phase is pre-loop master determination phase ("YES" at Step S901), the failed device identifying unit 2042 refers to the frame count data for each port by referring to the loop initialization data (Step S903). The failed device identifying unit 2042 then determines if any device has not received the frame within 10 msec (Step S904). If a device has not received the frame within 10 msec ("YES" at Step S904), the failed device identifying unit 2042 controls the failed device segregating unit 1051 in such a way that the device that has not received the frame within 10 msec is bypassed (Step S905). If no device is found that has not received the frame within 10 msec, the failed device identifying unit 2042 ends the LISM through LILP frames reception device failure process. Since, the loop initialization data is read every 50 μsec, 10 msec is equivalent to data of 200 areas.

Thus, if a device does not receive the frame within 10 msec, the failed device identifying unit 2042 controls the failed device segregating unit 1051 in such a way that the device is bypassed. Consequently, the loop status monitoring apparatus 20 identifies the device in which connection failure has occurred when no signal failure is detected even if the initialization process in the arbitration loop is stopped, thus quickly restoring the loop to its normal status.

(1-9) CLS Reception Device Failure Process Flow

Figure 10:
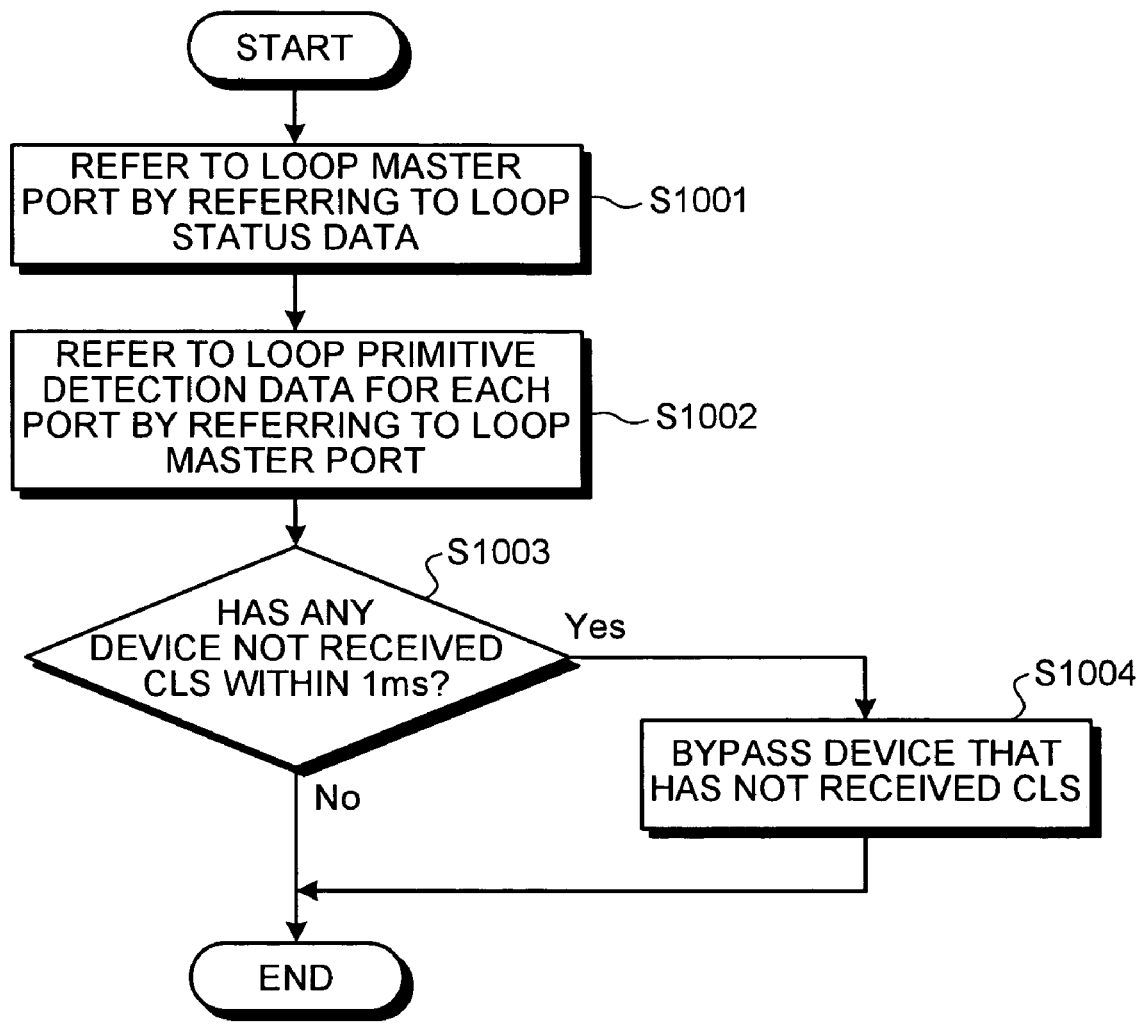
FIG. 10 is a flow chart of a CLS reception device failure process shown in FIG. 7.

The CLS reception device failure process of Step S708 shown in FIG. 7 is explained next with reference to FIG. 10. FIG. 10 is a flow chart of the CLS reception device failure process of Step S708 shown in FIG. 7. The failed device identifying unit 2042 refers to the bits 10 to 14 of the loop status detection data shown in FIG. 4 (Step S1001).

The failed device identifying unit 2042 then refers to the primitive detection data for each port by referring to the loop master port (Step S1002). The failed device identifying unit 2042 then refers back to the loop initialization data to determine if any device has not received the CLS within 1 msec (Step S1003). If a device has not received the CLS within 1 msec ("YES" at Step S1003), the failed device identifying unit 2042 controls the failed device segregating unit 1051 in such a way that the device that has not received the CLS within 1 msec is bypassed (Step S1004). If no device is found that has not received the LIP within 1 msec ("NO" at Step S1003), the failed device identifying unit 2042 ends the CLS reception device failure process.

Thus, if a device does not receive the CLS within 1 msec, the failed device identifying unit 2042 controls the failed device segregating unit 1051 in such a way that the device is bypassed. Consequently, the loop status monitoring apparatus 20 identifies the device in which connection failure has occurred when no signal failure is detected even if the initialization process in the arbitration loop is stopped, thus quickly restoring the loop to its normal status.

To sum up, in the first embodiment, the initialization failure detecting unit 2041 determines, based on the loop status detection data, whether an initialization failure in the form of a connection failure has occurred during the initialization of the arbitration loop. When an initialization failure is detected, the failed device identifying unit 2042 identifies the device in which the initialization failure has occurred, from the primitive detection data or the frame count data. Consequently, the loop status monitoring apparatus 20 identifies the device in which connection failure has occurred when no signal failure is found, even if the initialization process in the arbitration loop halts, thus quickly restoring the loop to a normal status.

The loop status data reading unit 203 reads from the switch device 10 loop status data during the initialization, and attaches the identification information to the loop status data. The loop initialization data storing unit 2021 adds sequentially the loop status data to which the identification information is attached and stores it as the loop initialization data. The loop initialization failure detecting unit 2041 determines, based on the loop initialization data stored in the loop initialization data storing unit 2021, that an initialization failure has occurred. If an initialization failure has occurred, the failed device identifying unit 2042 identifies, from the primitive detection data of the loop initialization data or the frame count data, the device in which the initialization failure has occurred. Consequently, the loop status monitoring apparatus 20 can identify the device in which connection failure has occurred when no signal failure is found, even if the initialization process in the arbitration loop halts, thus quickly restoring the loop to a normal status.

The identification information includes an index that identifies the loop initialization data as a time series data and the address at the beginning of the loop initialization data. Consequently, the loop status monitoring apparatus 20 can identify the loop initialization data as a time series data and easily retrieve the loop initialization data from the storage device.

The switch device 10 controls the failed device segregating unit 2051 in such a way that the device in which the initialization failure has occurred is segregated, and the failed device identifying unit 2042 in such a way that the device in which failure has occurred is segregated from the arbitration loop. Consequently, the loop status monitoring apparatus 20 can easily segregate the device identified as the device in which connection failure has occurred, and quickly restore the loop to its normal status.

The data counting unit 2042a counts the primitive detection data or the frame count data for which no reception of the primitive or frame required for the initialization is detected. The failed device identifying unit 2042 identifies a device as a device in which failure has occurred if the count of the primitive detection data or the frame count data counted by the data counting unit 2042a is greater than a predetermined value. Consequently, the loop status monitoring apparatus 20 can easily identify the device in which connection failure has occurred when no signal failure is found, even if the initialization process in the arbitration loop halts, thus quickly restoring the loop to a normal status.

In the first embodiment, the loop monitoring apparatus 20 reads and stores the loop initialization data of the arbitration loop from the switch device 10, and identifies the device in which connection failure has occurred based on the stored loop initialization data. However, the present invention can also be adapted in such a way that the loop status monitoring apparatus identifies the device in which failure has occurred based on the loop initialization data stored in the switch device. A second embodiment of the present invention is explained next in which the loop status monitoring apparatus identifies the device in which failure has occurred based on the initialization data stored in the switch device.

The structure of a fiber channel arbitration loop system 1a according to the second embodiment of the present invention is explained with reference to FIG. 11. FIG. 11 is a functional block diagram of the fiber channel arbitration loop system 1a according to the second embodiment of the present invention. The parts in FIG. 2 which are identical to those of the fiber channel arbitration loop system shown in FIG. 1 are not described again.

The difference between the fiber channel arbitration loop system 1a and the fiber channel arbitration loop system 1 according to the first embodiment is that the loop status data reading unit 203 of the latter is incorporated in the switch device 10a of the former. Accordingly, the switch device 10a includes a loop initialization data recording unit 1053 and a loop initialization data storing unit 1042. The loop status data reading unit 203 and the loop initialization data storing unit 2021 are done away with in the loop status monitoring apparatus 20a, and a loop initialization data obtaining unit 2043 is included.

The loop initialization data recording unit 1053 records the sequence of loop status data during the initialization of the arbitration loop as the loop initialization data in the loop initialization data storing unit 1042. For instance, during the initialization of the arbitration loop, the loop initialization data recording unit 1053 reads from the loop status data storing unit 1041 the loop status data every 50 μsec, and attaches an index and an address information at the beginning of the sequence of the loop status data. The loop initialization data recording unit 1053 then stores in the loop initialization data storing unit 1042, the sequence of loop status data, with the index and address attached, as the loop initialization data.

The loop initialization data obtaining unit 2043 gets the loop initialization data from the loop initialization data storing unit 1042 of the switch device 10a. The initialization process flow, the initialization failure process flow, etc. of loop status monitoring apparatus 20a includes the steps of reading the loop initialization data from the loop initialization data storing unit 1042 of the switch device 10a and implementing measures based on the read loop initialization data. The rest of the steps are similar to those of the first embodiment.

To sum up, the initialization failure detecting unit 2041 detects, from the loop initialization data obtained from the switch device 10a, that an initialization failure has occurred during the initialization of the arbitration loop. The failed device identifying unit 2042 identifies the initialization phase and the device in which the initialization failure has occurred, and controls the failed device segregating unit 1051 in such a way that the identified device is segregated from the arbitration loop. Consequently, the loop status monitoring apparatus 20a identifies the device in which connection failure has occurred When no signal failure is found, even if the initialization process in the arbitration loop halts, thus quickly restoring the loop to a normal status.

According to the present invention, whether an initialization failure in the form of a connection failure has occurred in an arbitration loop is detected from the loop status detection data, and if the initialization failure is detected, the device in which the initialization failure has occurred is identified from primitive detection data or frame count data. Consequently, the loop status monitoring apparatus identifies the device in which connection failure has occurred when no signal failure is found, even if the initialization process in the arbitration loop halts, thus quickly restoring the loop to a normal status.

Furthermore, according to the present invention, loop status data during initialization is read from a switch, and identification information is attached to the read loop status data. The loop status data with the identification information attached is sequentially added and stored as loop initialization data. Whether the initialization failure has occurred is detected from loop status detection data of the loop initialization data. If the initialization failure is detected, the device in which the initialization failure has occurred is identified from the primitive detection data or the frame count data. Consequently, the loop status monitoring apparatus identifies the device in which connection failure has occurred when no signal failure is found, even if the initialization, process in the arbitration loop halts, thus quickly restoring the loop to a normal status.

Moreover, according to the present invention, the loop initialization data includes an index that identifies the loop initialization data as a time series data, and address information at the beginning of the loop initialization data. Consequently, the loop status monitoring apparatus can identify the loop initialization data as a time series data and easily retrieve the loop initialization data from the storage device.

Furthermore, according to the present invention, the switch segregates the device in which the initialization failure has occurred and controls in such a way that the device in which the initialization failure has occurred is segregated from the arbitration loop. Consequently, the loop status monitoring apparatus can easily segregate the device identified as the device in which connection failure has occurred, and quickly restore the loop to its normal status.

Moreover, according to the present invention, for each device, the primitive detection data or the frame count data for which no reception of a primitive or a frame required for the initialization is detected is counted. If the number of the primitive detection data or the frame count data counted is greater than a predetermined value, the device is identified as a device in which the initialization failure has occurred. Consequently, the loop status monitoring apparatus can easily identify the device in which connection failure has occurred when no signal failure is found, even if the initialization process in the arbitration loop halts, thus quickly restoring the loop to a normal status.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A loop status monitoring apparatus that monitors a status of an arbitration loop that includes a plurality of devices and a switch that has a plurality of ports, each of which is connected to each of the devices, the loop status monitoring apparatus comprising:
   a data reading unit that reads loop status data which includes the loop status detection data, primitive detection data which indicates the reception status of the primitive at each of the ports, and frame count data which indicates the reception status of the frame at each of the ports from the switch, and attaches identification information to the loop status data read;
   a failure detecting unit that detects an occurrence of an initialization failure in the arbitration loop, when loop status detection data which identifies a phase of the initialization conflicts with an actual status of the initialization; and
   a device identifying unit that identifies, when the initialization failure is detected by the failure detecting unit, a device with the initialization failure from a reception status of a primitive or a frame at each of the ports.

2. The loop status monitoring apparatus according to claim 1, further comprising:
   a data storing unit that stores loop initialization data which is obtained by accumulating the loop status data with the identification information, wherein
   the failure detecting unit detects whether the initialization failure has occurred based on the loop status detection data of the loop initialization data stored in the data storing unit, and
   the device identifying unit identifies, when the initialization failure is detected, the device with the failure from the primitive detection data or the frame count data of the loop initialization data.

3. The loop status monitoring apparatus according to claim 2, wherein the data reading unit attaches the identification information which includes an index that identifies the loop initialization data as time series data, and address information at the beginning of the loop initialization data to the status loop data.

4. The loop status monitoring apparatus according to claim 1, wherein the device identifying unit controls the switch in such a manner that the device with the initialization failure is segregated from the arbitration loop.

5. The loop status monitoring apparatus according to claim 1, wherein the device identifying unit identifies the device with the initialization failure when the primitive or the frame is not received by a port connected to the device in a predetermined period of time.

6. The loop status monitoring apparatus according to claim 5, wherein the device identifying unit refers to primitive detection data which indicates whether a loop-initialization commencing primitive that commences the initialization is received by each of the ports to identify the device with the initialization failure occurred.

7. The loop status monitoring apparatus according to claim 5, wherein the device identifying unit refers to frame count data which indicates whether a frame in the initialization is received by each of the ports to identify the device with the initialization failure.

8. The loop status monitoring apparatus according to claim 5, wherein the device identifying unit refers to primitive detection data which indicates whether an initialization ending primitive that ends the initialization is received by each of the ports to identify the device with the initialization failure.

9. A loop status monitoring method for a loop status monitoring apparatus that monitors a status of an arbitration loop that includes a plurality of devices and a switch that has a plurality of ports each of which is connected to each of the devices, the loop status monitoring method comprising:

reading loop status data which includes the loop status detection data, primitive detection data which indicates the reception status of the primitive at each of the ports, and frame count data which indicates the reception status of the frame at each of the ports from the switch, and attaches identification information to the loop status data read detecting an occurrence of an initialization failure in the arbitration loop, when loop status detection data which identifies a phase of the initialization conflicts with an actual status of the initialization; and identifying, when the initialization failure is detected by the failure detecting unit, a device with the initialization failure from a reception status of a primitive or a frame at each of the ports.

10. A computer-readable recording medium that stores a status monitoring program for a loop status monitoring apparatus that monitors a status of an arbitration loop that includes a plurality of devices and a switch that has a plurality of ports each of which is connected to each of the devices, and the loop status monitoring program makes a computer execute reading loop status data which includes the loop status detection data, primitive detection data which indicates the reception status of the primitive at each of the ports, and frame count data which indicates the reception status of the frame at each of the ports from the switch, and attaches identification information to the loop status data read detecting an occurrence of an initialization failure in the arbitration loop, when loop status detection data which identifies a phase of the initialization conflicts with an actual status of the initialization; and identifying, when the initialization failure is detected by the failure detecting unit, a device with the initialization failure from a reception status of a primitive or a frame at each of the ports.

* * * * *